July 1, 1924.  
T. MIDGLEY  
1,499,679  
MACHINE FOR APPLYING ENDLESS BANDS TO RING CORES  
Filed Feb. 4, 1922   3 Sheets-Sheet 2
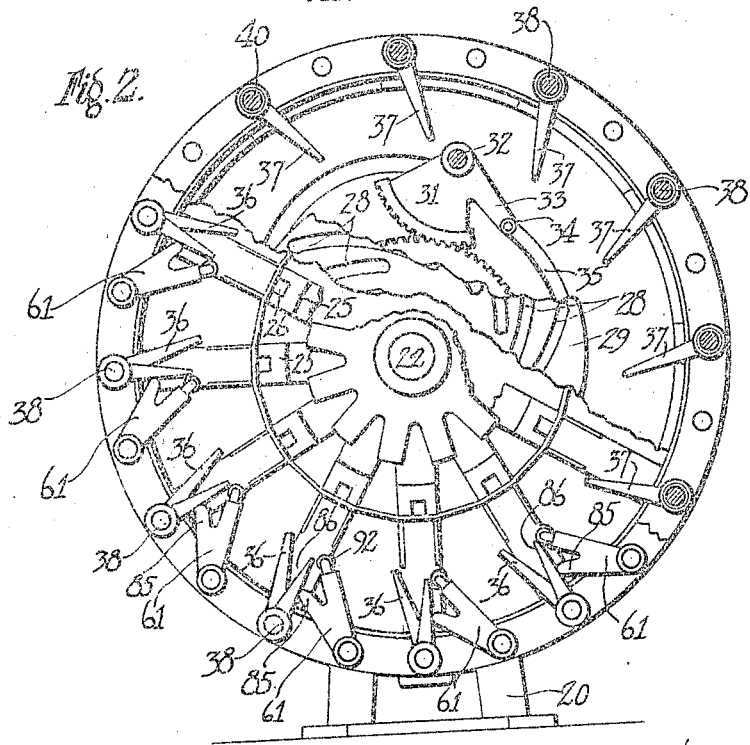
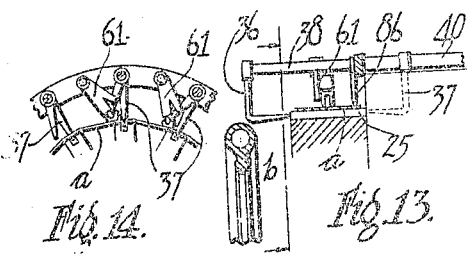
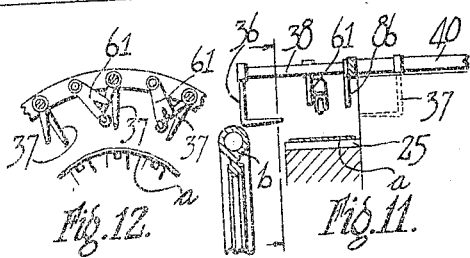
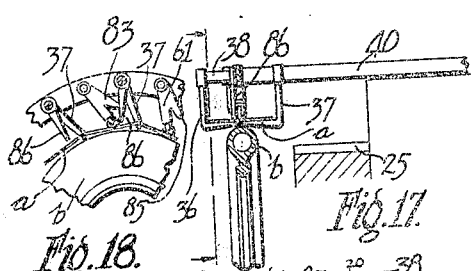
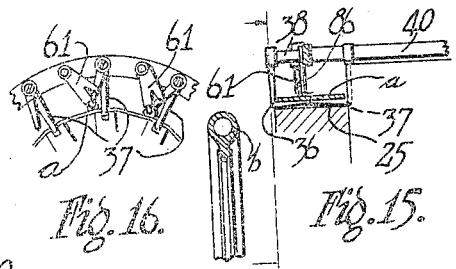
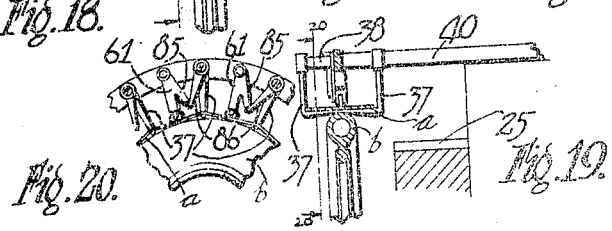
INVENTOR  
*Thomas Midgley*  
BY  
ATTORNEY

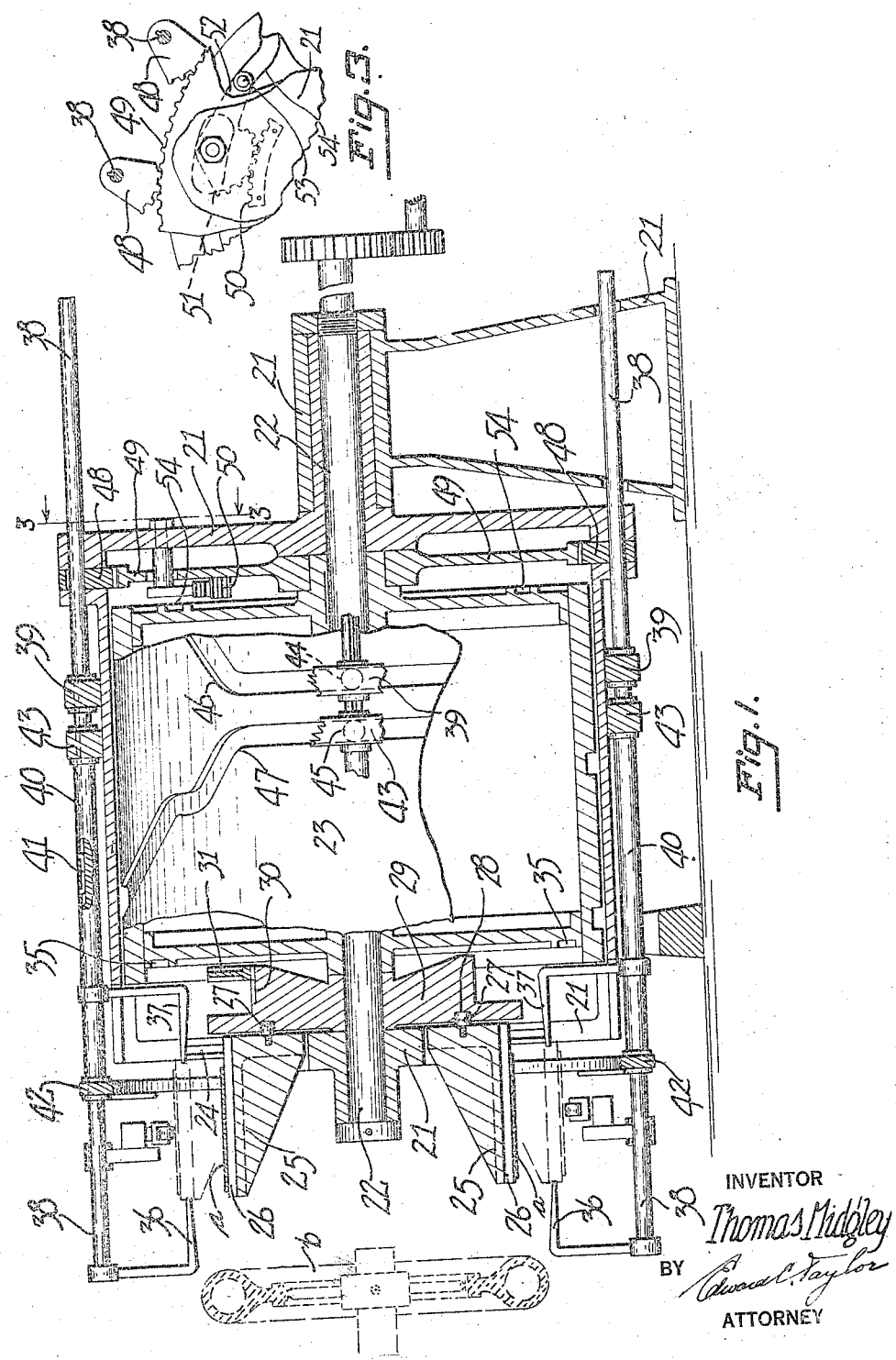

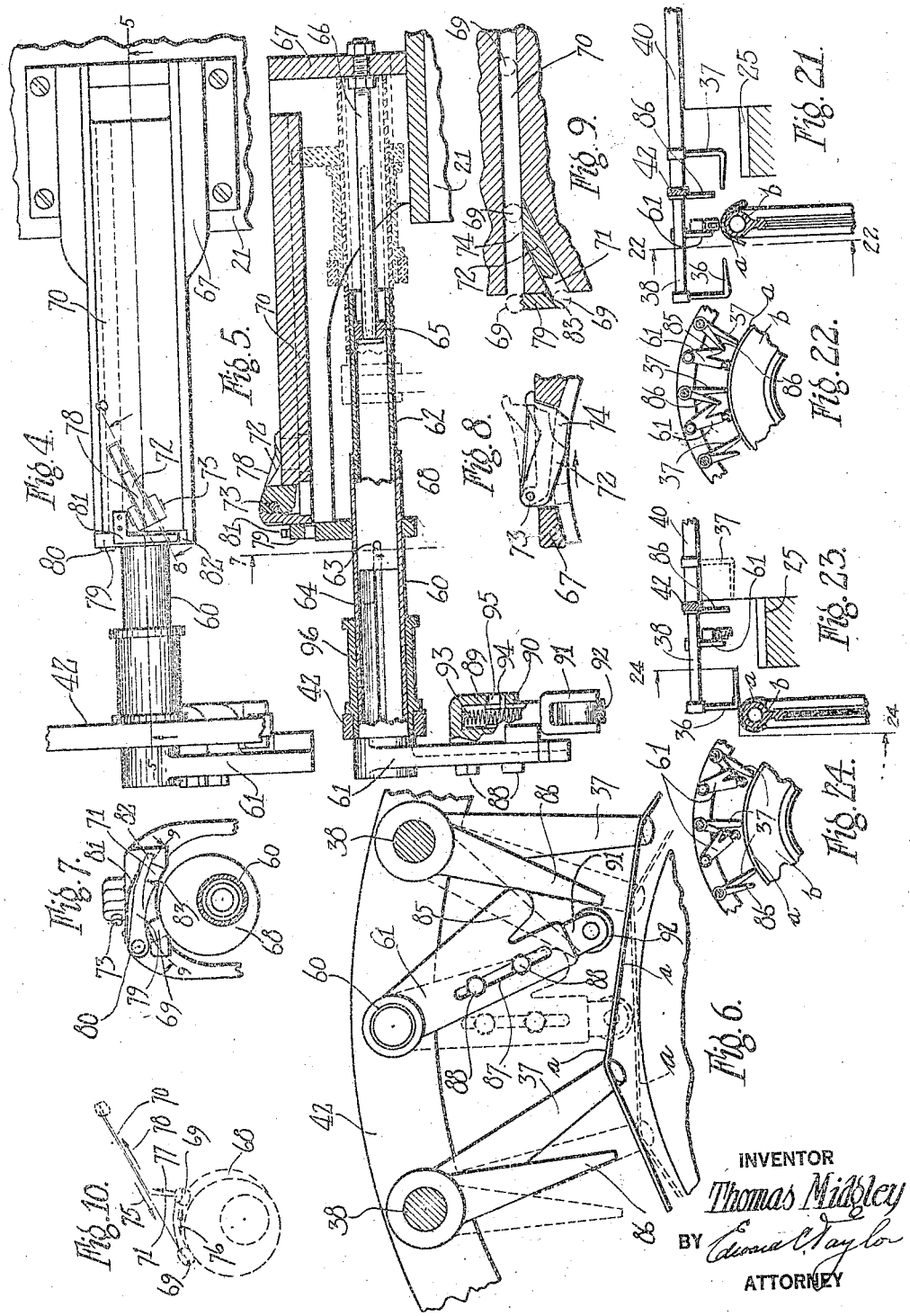

Patented July 1, 1924.

1,499,679

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

MACHINE FOR APPLYING ENDLESS BANDS TO RING CORES.

Application filed February 4, 1922. Serial No. 534,131.

*To all whom it may concern:*

Be it known that I, THOMAS MIDGLEY, a citizen of the United States of America, residing at Hampden, in the county of Hampden and State of Massachusetts, have invented certain new and useful Improvements in a Machine for Applying Endless Bands to Ring Cores, of which the following is a specification.

My invention relates to a machine for applying endless bands of elastic material to supports, particularly to a machine designed for the positioning of endless bands of tire building material on the ring cores used in the construction of tire casings. Such a machine is described in my Patent No. 1,455,260, dated May 15, 1923, the present invention being an improvement upon the machine shown therein. It has for its object the accurate positioning of such bands upon the cores, and the maintaining of the bands in their correct positions while they are being released by the positioning means. It also has for its object various other features of operation and construction which will appear from the description and claims.

The invention will now be described in connection with the accompanying drawings, in which Fig. 1 is a longitudinal section through a machine embodying my invention;

Fig. 2 is a view taken from the left in Fig. 1, partly broken away;

Fig. 3 is a partial end view taken upon line 3—3 of Fig. 1;

Fig. 4 is a top plan view of one of the hold-down units.

Fig. 5 is a section on line 5—5 of Fig. 4;

Fig. 6 is an enlarged partial end view corresponding to Fig. 2 illustrating the motion of the hold-down units;

Fig. 7 is a section on line 7—7 of Fig. 5;

Fig. 8 is a section on line 8—8 of Fig. 4;

Fig. 9 is a section on line 9—9 of Fig. 7;

Fig. 10 is a perspective diagrammatic view showing the path of the cam roll which governs the rotative movement of each hold-down unit;

Figs. 11 and 12 are respectively diagrammatic side and end views of the apparatus illustrating the initial stage in the application of a band to a core; and Figs. 13 to 24 inclusive are similar pairs of views showing successive stages in the application of the band.

The machine will first be described with relation to the elements that expand and position the endless bands about the ring cores. Journaled in a frame 21 is a shaft 22 fixed to which is a cam drum 23 having cam grooves in its end faces and its cylindrical surface. Mounted for radial reciprocation in guides 24 in support 20 is a series of expander fingers 25 having axially extending grooves 26 in their outer surface. The motion of these fingers is controlled by cam rollers 27 coacting with cam grooves 28 in a cam disk 29 journaled freely on shaft 22. The disk 29 has a hub portion provided with gear teeth 30 meshing with teeth on a gear segment 31 pivoted at 32 to the frame and having an arm 33 carrying a cam roll 34 coacting with a cam groove 35 in the end of drum 23. Rotation of the cam drum 23 will by this mechanism oscillate segment 31 and disk 29 and consequently cause fingers 25 to move alternately outwardly and inwardly.

Cooperating with expander fingers 25 in a manner to be described are opposed sets of L-shaped carrier fingers 36 and 37. Fingers 36 are carried on shafts 38, extending parallel to the axis of the drum past its outer surface and secured against endwise motion in a ring 39. Fingers 37 are carried by tubes 40 enclosing shafts 38 but having splined connections 41, whereby they are free to move axially upon the shafts but are constrained to rotate therewith. Tubes 40 are secured against endwise motion in rings 42 and 43. Rings 39 and 43 are provided with cam rolls 44 and 45 coacting with cam grooves 46 and 47 in cam drum 23 whereby the carrier fingers will be caused to go through certain reciprocating movements which will be later described. In order to rotate the carrier fingers slightly shafts 38 are splined to segmental gears 48 which mesh with teeth on a large gear 49. Mounted on one face of this large gear is a gear segment 50, meshing with which is a gear segment 51 having an arm 52 carrying a cam roll 53 co-acting with a groove 54 in the end of drum 23. On the rotation of drum 23 gear segment 51 and consequently gear 49 will be oscillated, causing each shaft 38 to be oscillated correspondingly in whatever longitudinal position it finds itself. Tubes 40 will also be rotated by reason of the splined connection 41.

The sequence of operations of the parts so far described may now be considered. Starting with the parts in the full line position of Fig. 1 a band a of elastic tire building material, such as a tread or a carcass ply, is placed in encircling relation to the expander fingers 25. Drum 23 is then set in rotation by any suitable means. The first effect is to cause the expander fingers 25 to move radially outwardly from the position of Figs. 11 and 12 to the full line position of Figs. 13 and 14, so that the band is expanded from a circumference less than that of the core b on which the band is to be mounted to a circumference substantially equal to the circumference of the core. The cam controlling the expander fingers now holds them in their expanded position while the two sets of carrier fingers 36 and 37 close from the positions of Fig. 13 to their positions shown in Fig. 15. In this movement the axially extending parts of the carrier fingers travel in the grooves 26 in the outer surface of the expander fingers, so that they underlie the expanded band. The expander fingers are now caused to move inwardly, depositing the band upon the carrier fingers. The latter are now moved by cams 46 and 47 to the positions of Fig. 17 encircling the core b, the two sets of fingers moving together during this motion. As the carrier fingers move towards the core they are slightly rotated into the full line position of Fig. 6 by cam 54 and the associated mechanism, and after they reach their core-encircling position they are moved back into the dotted line position of that figure. By this rotative motion the band is given a slight additional expansion on its journey to the core which enables it to clear easily the crest of the core or the previously laid material thereon (Figs. 17 and 18). After the band has reached its core encircling position the rotation of the fingers back to their radial position (Figs. 19 and 20) permits the chordal portions of the band between the fingers to touch and, if the band or core is covered with an adhesive composition, to adhere to the core. The mechanism thus far described and the manner of its operation are more fully described in my Patent No. 1,455,260. The two sets of carrier fingers are now separated (Figs. 21 and 22) so that the band is deposited upon the core, its central peripheral line first and then the sides.

The devices to which the present invention is more particularly directed relate to the holding of the chordal portions of the band in proper registered position while the sets of fingers separate to deposit the band, so that any tendency of the fingers to displace the band during their separation will be avoided. In order to accomplish this purpose I have provided a series of hold-down members arranged to alternate with the pairs of carrier fingers 36, 37 operative to press the center of the band a against the core b during the separating movement of the fingers. All of the hold-down units are similar, and a description of one will suffice for all.

Rotatable in ring 42 intermediate each adjacent pair of rods 38 is a tube 60 carrying at its end an arm 61. Sliding in this tube is a tube 62 having a pin 63 traveling in a slot 64 in the first tube, and having sliding engagement on a plug 65 secured by a rod 66 to a bracket 67 fast to frame 21. This arrangement furnishes a guide for longitudinal motion of the arm 61 which will telescope into very small compass and is mechanically desirable in some instances for this reason. A simple longitudinal bearing, however, would serve the same functional purpose.

Fast on tube 60 is a collar 68 carrying a cam roll 69 (Fig. 7) cooperating with a cam slot in one face of bracket 67. This cam slot has a straight portion 70 and an angular portion 71 (Figs. 4, 9 and 10). A latch 72 (Figs 8 and 9) pivoted at 73 to bracket 67 has a beveled end 74 normally forming a continuation of the wall of the straight portion of the cam slot. When the cam roll moves in the direction of the arrow 75 in Fig. 10 the effect is that of a straight cam groove. After the cam roll has been caused to move over the path 76 and down the angular path 77 by means to be described it rides under the latch 72, lifting it into the dotted line position of Fig. 8. To press the latch down into its normal position a suitable spring 78 is provided. A latch 79 to direct the cam roll from path 76 to path 77 is pivoted at 80 and pressed downwardly into its normal position shown in Fig. 7 as by spring 81. The end of this latch has an overhanging lip 82 to hold it in position and a shoulder 83 which will drop behind the cam roll when the latter is opposite the entrance end of cam groove 71, the shoulder being cut at an angle as shown in Fig. 9 so as to direct the roll into the groove.

Arm 61 carries a projection 85 adapted to contact at certain points in the cycle with an arm 86 fast to the tube 40 carrying the adjacent carrier finger 37 so that as the finger is rotated from the full line to the dotted line position of Fig. 6 the arm 61 will be correspondingly moved. The arm 61 has a slot 87 through which pass studs 88 by which a casing 89 is secured for longitudinal adjustment on the arm. In the casing slides a tubular extension 90 of a yoke 91 carrying a roller 92 adapted to make yielding contact with the band a after the latter has been brought into encircling relation with the core. A spring 93 serves to press the yoke 91 outwardly, its motion in this direction being limited by a pin 94 carried by extension 90 and running in a slot 95 in the casing.

The operation of the parts described above in their preferred form will now be given, particular reference being made to Figs. 11 to 24. Figs. 11 and 12 show the relative position of the elements as an unexpanded band $a$ first placed around the circumferential series of expander fingers 25. In this position the carrier fingers 36, 37 extend radially (Fig. 12) and the two sets are separated to allow the band to be expanded between them. The next stage is the expansion of the band (Figs. 13 and 14) to a circumference permitting the two sets of carrier fingers being moved axially together (Figs. 15 and 16) so as to underlie the band on the expander fingers, the carrier fingers passing into grooves 26 in the expander fingers. A slight retraction of the expander fingers allows the band to contract upon the carrier fingers, so that it is entirely supported by them. The carrier fingers then move axially, both sets moving together, until the band is located in encircling relation to the core (Fig. 17) the carrier fingers partaking individually of a slight rotative movement during this axial movement (Fig. 18) so that the chordal portions of the band, which it will be observed has been expanded into a polygonal prism, are carried clear of the crest of the core. The arms 61 remain in their angular or inactive positions during these motions.

The band is now held by the carrier fingers in encircling relation to the core. The next series of operations serve to release it so that it is first held firmly in place on the core at its circumferential center line and then has its sides released so that they may contract down the sides of the core. The first operation in this series is to permit the chordal portions of the band to contract upon the core. This is accomplished by rotating the carrier fingers about their original axes until they are again radial (Fig. 20). This decreases the diameter at the corners of the polygon and consequently permits the remainder of the band to contract into contact with the core. By the axial movement of the carrier fingers 37 from the position of Fig. 13 to that of Fig. 15 arm 86 is brought in back of arm 61 and pushes the latter ahead of it, the cam roller 69 traveling in the straight cam groove 70 and hence keeping the arm 61 in its angular position. As the carrier fingers move from the position of Fig. 15 to that of Fig. 17 they rotate slightly about their individual axes, causing arm 86 to slip by the back of arm 85 and take a position adjacent the end of the latter as shown in Fig. 18. After the band has been located around the core as shown in Figs. 17 and 18 the carrier fingers rotate to their radial positions (Fig. 20), arm 61 being pushed by ring 42 during this motion. During this rotation of arm 61 the cam roll 69 will travel along the straight path 76.

The roll 92 will now be spring pressed against the band on the core so as to hold its chordal portions against axial displacement. The opposed sets of carrier fingers now separate (Figs. 21 and 22), roller 92 meanwhile holding the band $a$, until a spacing collar 96 on the ring 42 hits against collar 68. Further motion of ring 42, which may be during the separation of the two sets of carrier fingers or during the subsequent movement of the two sets of fingers away from the core (Fig. 23) will move tube 60 and arm 61 axially, carrying cam roll 69 into the angular cam path 71 and consequently turning arm 61 back into its angular position (Fig 24). The last portion of the travel of the carrier fingers back to the position in which they are ready to receive another expanded band from the expander fingers will cause the cam roll 69 to travel in the straight portion 70 of the cam groove and maintain it in its angular position.

Having thus described my invention, I claim:

1. A device for applying endless bands to cores in the manufacture of tire casings, which comprises two opposed series of L-shaped fingers adapted to support a band, means for rotating the fingers slightly about their individual axes for expanding and contracting the band, devices interposed between certain of said fingers for holding the band upon the core, and means for operating the holding devices by the motion of the fingers.

2. A device for applying endless bands to cores in the manufacture of tire casings, which comprises two opposed series of supports for holding a band in encircling relation to a core, means for separating the two series to release the band upon the core, and means for holding the band in place during said separation.

3. A device for applying endless bands to cores in the manufacture of tire casings, which comprises two opposed series of supports for holding a band in encircling relation to a core, means for separating the two series to release the band upon the core, a series of holding devices each arranged intermediate adjacent supports of the series, and means for operating the holding devices to cause them to press the band against the core during the separation of the series of supports.

4. An apparatus for applying endless bands to cores in the manufacture of tire casings including means for positioning and releasing a band in encircling relation to a core, and means for holding the band in position during its release which comprises a plurality of swinging pressers, means for moving the pressers to overlie the core, and means to swing the pressers towards the core into contact with the band.

5. An apparatus for applying endless bands to cores in the manufacture of tire casings including means for positioning and releasing a band in encircling relation to a core and means for holding the band in position during its release which comprises a plurality of swinging pressers, means for projecting the pressers so that they overlie the core, and means to swing the pressers towards the core into contact with the band, said last named means being automatically controlled by the band releasing means.

6. An apparatus for applying endless bands to cores in the manufacture of tire casings including a plurality of carriers adapted to support the band in the form of a polygon, means for moving the carriers to permit the chordal portions of the band to contract upon the core, means controlled by such movement of the carriers for clamping the band upon the core, and means for moving the carriers to remove them from contact with the core.

7. An apparatus for applying endless bands to cores in the manufacture of tire casings including two opposed series of carriers adapted to support the band, means for moving the carriers into and out of encircling relation to the core, means for separating the two series to release the band upon the core, means for clamping the band to the core during the releasing operation, and means operable in timed relation to the movement of the carriers to cause the clamping means to press the band to the core during the separation of the two series of carriers, and to withdraw into inoperative position during the movement of the carriers out of encircling relation to the core.

THOMAS MIDGLEY.